United States Patent [19]

Wilson et al.

[11] 4,231,827

[45] Nov. 4, 1980

[54] PRESS POLISHING AND LAMINATING PLASTIC TRANSPARENCIES USING POLYCARBONATE PRESSING PLATES

[75] Inventors: James F. Wilson, Worthington; James C. Craig, Butler, both of Pa.

[73] Assignee: PPG Industries, Inc., Pittsburgh, Pa.

[21] Appl. No.: 25,151

[22] Filed: Mar. 29, 1979

[51] Int. Cl.$^3$ .................... B32B 27/00; B29C 1/00
[52] U.S. Cl. .................... 156/214; 156/228; 156/298; 156/300; 156/303.1; 264/1; 264/293; 264/320; 264/337
[58] Field of Search ............... 156/245, 242, 214, 221, 156/222, 228, 293, 298, 303.1, 106, 102, 166, 219, 300; 264/320, 1, 322, 340, 325, 337, 330, 331, 293, 219, 272, 290, 291; 249/134; 425/DIG. 808

[56] References Cited

U.S. PATENT DOCUMENTS

| | | | |
|---|---|---|---|
| 2,464,826 | 3/1949 | Neher et al. | 428/500 |
| 3,317,640 | 5/1967 | Jones | 425/808 |
| 3,681,167 | 8/1971 | Moore | 428/412 |
| 3,784,655 | 1/1974 | Lewchuk et al. | 264/293 |
| 3,808,077 | 4/1974 | Rieser et al. | 156/99 |
| 3,810,815 | 5/1974 | Welhart et al. | 428/412 |
| 3,894,710 | 7/1975 | Sarofeen | 425/808 |
| 4,009,064 | 2/1977 | Andrews | 156/245 |
| 4,078,107 | 3/1978 | Bitterice et al. | 428/38 |

*Primary Examiner*—Michael W. Ball
*Attorney, Agent, or Firm*—Edward I. Mates

[57] ABSTRACT

This invention relates to press polishing transparencies for lightweight aircraft comprising at least one exterior sheet of acrylic resin involving the use of a polycarbonate pressing plate against the acrylic resin sheet. Both the polycarbonate pressing plate and as many sheets of acrylic resin as are included in the laminate may be press polished while flat by pressurized engagement against a smoothly surfaced flat glass pressing mold. Then, the polycarbonate pressing plate and as many sheets of acrylic resin as are included in the transparency are sag bent to conforming shapes with optional vacuum forming. The polycarbonate pressing plate so shaped is used directly against an acrylic resin surface without any parting material therebetween to press polish the outward facing surface of the acrylic resin sheet(s) so shaped and simultaneously laminate the shaped acrylic resin sheets when the latter are assembled with one or more layers of flexible interlayer material. Certain acrylic resin sheets may be further treated, by embedding wire and/or fusing them together, prior to the press polishing while flat.

13 Claims, 13 Drawing Figures

OPERATIONAL STEPS

1. SAG BEND AND VACUUM FORM POLYCARBONATE PRESSING PLATE ON FORMING FIXTURE.
2. SAG BEND AND FORM INNER ACRYLIC SHEET ON FORMING FIXTURE
3. APPLY ANTISTATIC WIRE CIRCUIT TO FLAT ACRYLIC SHEET.
4. APPLY HEATING WIRE CIRCUIT TO FLAT ACRYLIC SHEET.
5. ASSEMBLE FLAT ACRYLIC SHEETS WITH ANTI-STATIC WIRE ADJACENT EXPOSED SURFACE OF ASSEMBLY (WIRES IN ONE DIRECTION) AND HEATING WIRE CIRCUIT ADJACENT INTERFACIAL SURFACES OF ASSEMBLY (WIRES EXTENDING NORMAL TO SAID DIRECTION).
6. FUSE ASSEMBLY OF FLAT ACRYLIC SHEETS
7. SAG BEND AND VACUUM FORM ASSEMBLY OF FUSED ACRYLIC SHEETS ON FORMING FIXTURE TO FORM CONVEX SHAPE ON SURFACE ADJACENT ANTI-STATIC WIRE CIRCUIT.
8. ASSEMBLE FORMED POLYCARBONATE PRESSING PLATE WITH ITS CONCAVE SURFACE FACING CONVEX SURFACE OF FUSED, FORMED ACRYLIC SHEETS AND ADDITIONAL LAYERS OF MATERIAL TO BE LAMINATED AGAINST CONCAVE SURFACE OF FUSED, FORMED ACRYLIC SHEETS, AND PROTECT EXPOSED ACRYLIC SHEET
9. LAMINATE ASSEMBLY FORMED IN STEP 8.
10. SEPARATE POLYCARBONATE PRESSING PLATE FROM RESULTING LAMINATED ASSEMBLY.

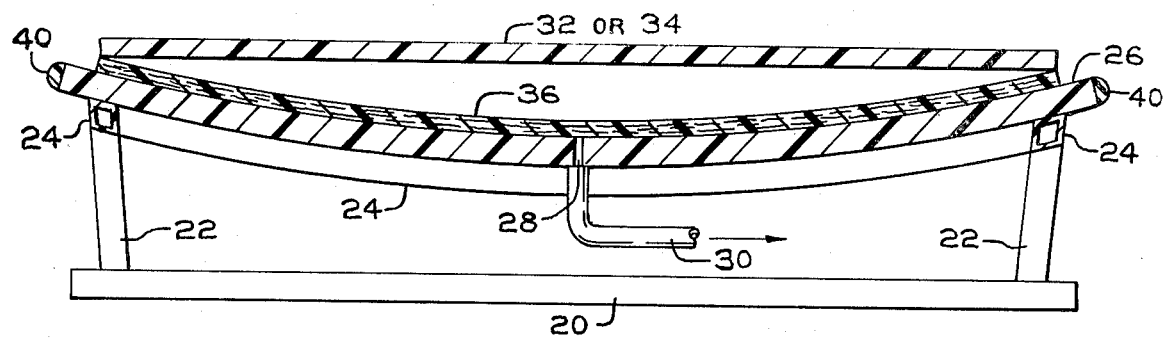
Fig.1
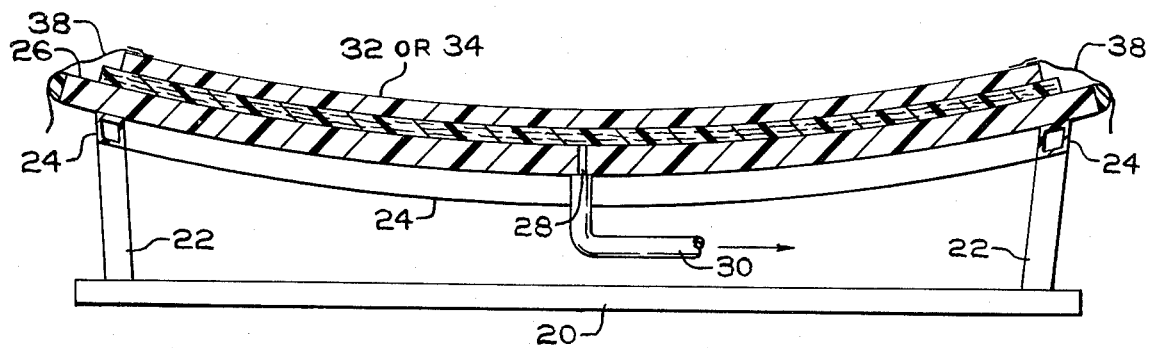
Fig.2
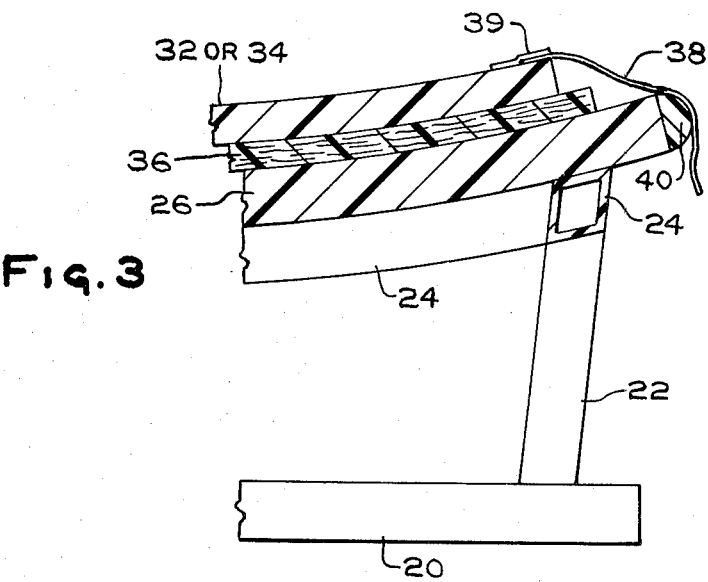
Fig.3
Fig.4
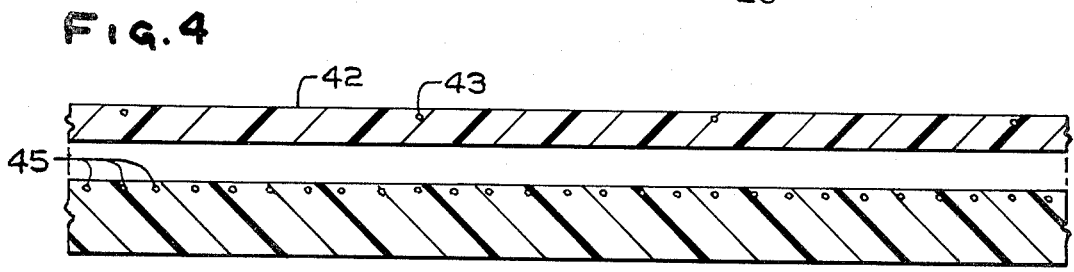

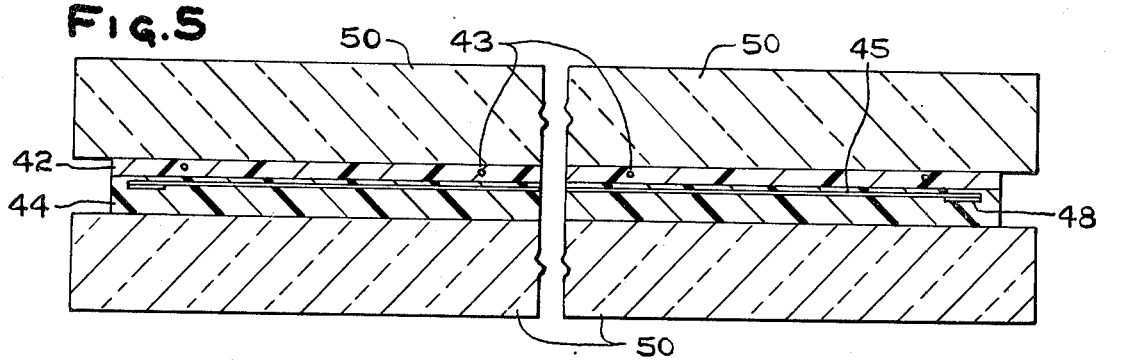
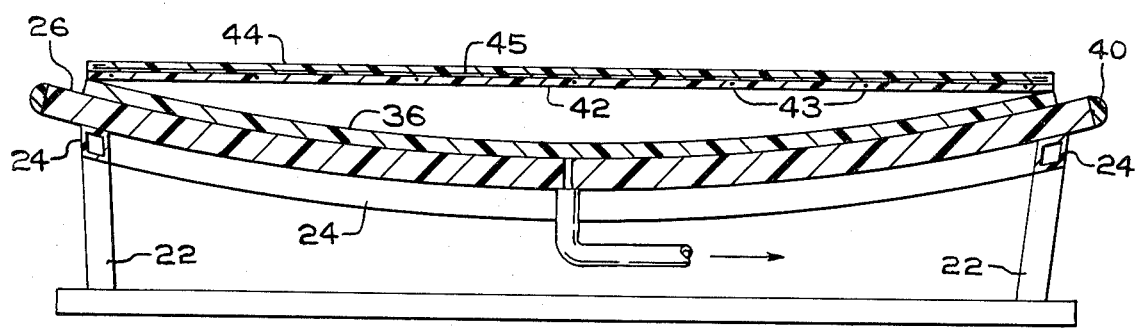
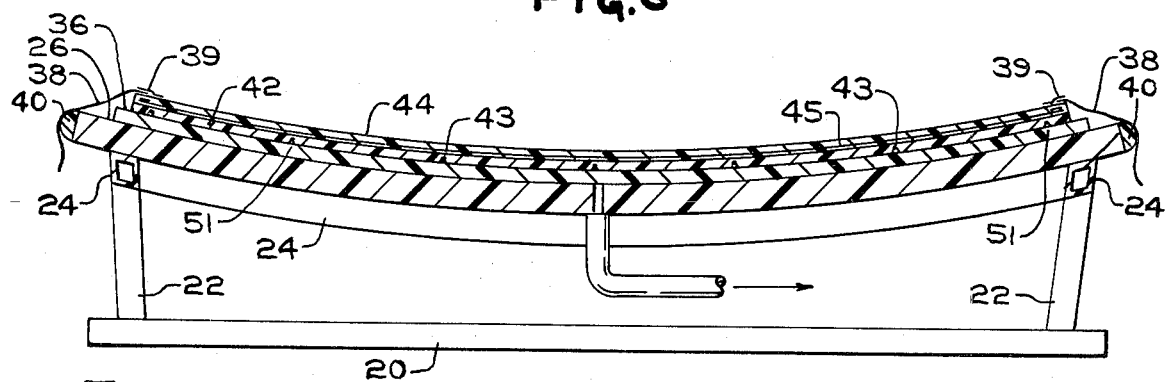
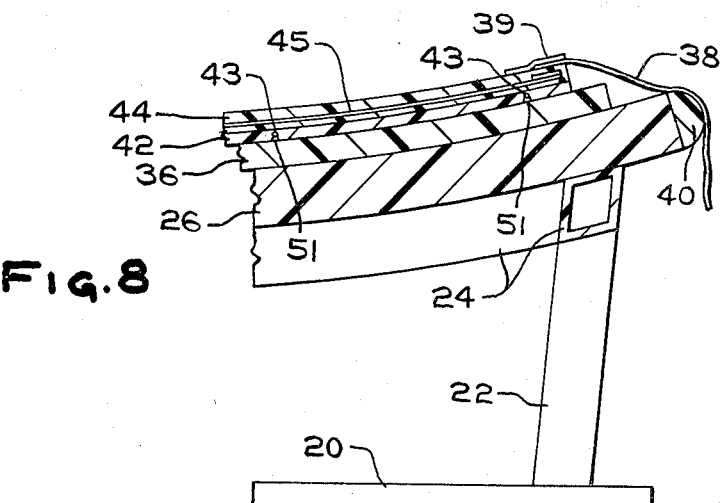

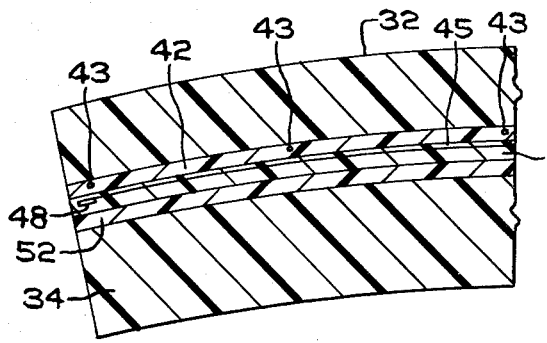
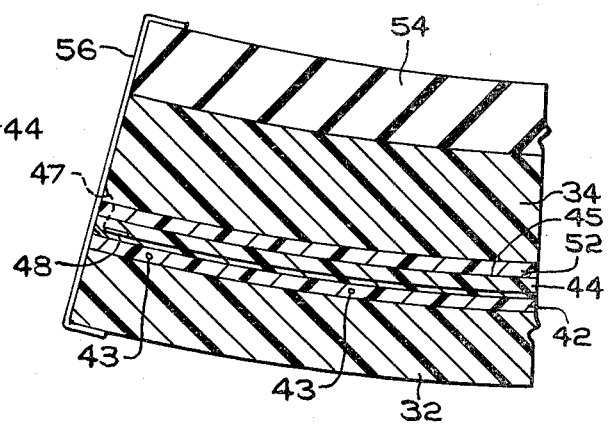

Fig. 9   Fig. 10

OPERATIONAL STEPS

1. SAG BEND AND VACUUM FORM POLYCARBONATE PRESSING PLATE ON FORMING FIXTURE.
2. SAG BEND AND FORM INNER ACRYLIC SHEET ON FORMING FIXTURE
3. APPLY ANTISTATIC WIRE CIRCUIT TO FLAT ACRYLIC SHEET.
4. APPLY HEATING WIRE CIRCUIT TO FLAT ACRYLIC SHEET.
5. ASSEMBLE FLAT ACRYLIC SHEETS WITH ANTI-STATIC WIRE ADJACENT EXPOSED SURFACE OF ASSEMBLY (WIRES IN ONE DIRECTION) AND HEATING WIRE CIRCUIT ADJACENT INTERFACIAL SURFACES OF ASSEMBLY (WIRES EXTENDING NORMAL TO SAID DIRECTION).
6. FUSE ASSEMBLY OF FLAT ACRYLIC SHEETS
7. SAG BEND AND VACUUM FORM ASSEMBLY OF FUSED ACRYLIC SHEETS ON FORMING FIXTURE TO FORM CONVEX SHAPE ON SURFACE ADJACENT ANTI-STATIC WIRE CIRCUIT.
8. ASSEMBLE FORMED POLYCARBONATE PRESSING PLATE WITH ITS CONCAVE SURFACE FACING CONVEX SURFACE OF FUSED, FORMED ACRYLIC SHEETS AND ADDITIONAL LAYERS OF MATERIAL TO BE LAMINATED AGAINST CONCAVE SURFACE OF FUSED, FORMED ACRYLIC SHEETS, AND PROTECT EXPOSED ACRYLIC SHEET
9. LAMINATE ASSEMBLY FORMED IN STEP 8.
10. SEPARATE POLYCARBONATE PRESSING PLATE FROM RESULTING LAMINATED ASSEMBLY.

Fig. 11

PRESS POLISHING AND LAMINATING PLASTIC TRANSPARENCIES USING POLYCARBONATE PRESSING PLATES

BACKGROUND OF THE INVENTION

1. Field of the Invention

This invention relates to the fabrication of lightweight plastic transparencies, particularly those comprising at least one sheet of acrylic plastic resin. The acrylic resin may form a monolithic sheet or it may be laminated to additional sheets to form a laminated transparency especially suitable for aircraft.

The transparencies for aircraft are required to fit within a frame and have to be shaped to fit within the frame. In addition, it is desirable for good optics that the surfaces of the acrylic resin sheet that forms an exterior or interior surface of an aircraft transparency be as free from surface marks as possible.

Acrylic resin is used as a transparent shielding device where glass is unsafe, too heavy, or otherwise impractical. Cast polymethyl methacrylate, which is currently marketed under such trademarks as PLEXIGLAS by Rohm and Haas and LUCITE by DuPont, is a typical acrylic resin that has several characteristics which make it ideally suited for aircraft transparencies, such as canopies and windows for lightweight aircraft. For example, it is considerably lighter than glass, yet is quite strong at ambient temperatures. Moreover, while acrylic resin is relatively soft compared to glass and therefore scratches more readily than glass, the scratches are easily removed merely by polishing the marred area with common polishing compounds. Furthermore, acrylic resin is fairly stable from a chemical standpoint. It is relatively unaffected by most solvents. Furthermore, acrylic resins accept ultraviolet light stabilizers without significantly impairing their light transmitting characteristics.

For the above reasons, acrylic resin and particularly cast polymethyl methacrylate has been used as an outer layer of either monolithic or laminated curved aircraft transparencies, particularly for lightweight planes which fly at relatively low altitudes and at relatively low speeds. Under such circumstances, the acrylic windows, windshields or canopies of aircraft do not develop a temperature above the softening point of the acrylic resin, which is in the vicinity of 225° F. (107° C.).

The optical properties of solid, acrylic resin sheet surfaces have been improved and surface marks reduced in intensity by press polishing. During press polishing, an acrylic resin sheet is held against a relatively rigid mold having an optically smooth surface to form an assembly. The assembly is subjected to sufficient elevated temperature and pressure for sufficient time for said acrylic resin sheet surface to develop the smoothness of the mold surface. The temperature at which pressure is applied is below the deformation temperature of the mold and sufficiently high to soften and press polish the surface of the solid acrylic resin sheet. However, unless the mold surface is composed of a material compatible with that of a solid acrylic resin sheet, defects are imparted to the surface of the solid acrylic resin sheet either during press polishing or during the separation of the mold from the press polished surface of the acrylic resin sheet. The mold materials suggested for use in the prior art for press polishing solid acrylic sheets have not been as good as desired for reasons mentioned in the discussion of specific prior art materials that follows.

In the past, acrylic resin sheets have been press polished by molds composed of various metals such as stainless steel coated with a high temperature mold release agent, or by a highly mirror polished plate of hard rolled brass that may be nickel plated or plated with coatings of nickel and chromium, for example, or by non-metallic pressing materials such as smoothly surfaced sheets of polyethylene glycol of terephthalic acid and smoothly surfaced glass plates provided on their resin facing surface with a suitable parting material.

It is also known to laminate an acrylic resin sheet to either another acrylic resin sheet or to a polycarbonate sheet through an interlayer material or directly to the polycarbonate sheet using an adhesive such as an epoxy resin by applying a highly polished rigid member against the surface to be press polished under sufficient heat and pressure to simultaneously laminate the layers together during press polishing.

Metal or glass press polishing or laminating molds have been found suitable for press polishing and laminating flat sheets of acrylic plastic resin. However, when the acrylic resin surface to be press polished is curved, metal press polishing molds cause the convex surface of the acrylic plastic sheet to develop tiny surface openings during press polishing even when the press polishing molds are provided with parting material. Glass and metal molds used to press polish shaped sheets of rigid plastic such as polycarbonate and acrylic resin are difficult to shape to complicated shapes. Metal molds must be ground and polished to develop smooth surfaces. Polishing marks in the shaped surface of the metal press polishing molds tend to print off onto the surface of a plastic sheet that is press polished. Furthermore, glass compositions tend to devitrify when heated to elevated temperatures required for shaping to complicated shapes. The devitrification pattern on the glass tends to print off onto the plastic surface, even with a thin layer of parting material applied to the glass press polishing mold.

Shaped molds covered with polyethylene glycol of terephthalic acid (Mylar) are difficult to make because it is hard to apply the cover to a shaped surface without causing wrinkling. Shaped press polishing molds for use with shaped acrylic plastic sheets that do not cause flaws during press polishing were needed prior to the present invention.

DESCRIPTION OF THE PRIOR ART

U.S. Pat. No. 2,464,826 to Neher and Bauer discloses a method by which a plurality of sheets, at least one of which is an acrylic resin sheet, is joined together under heat and pressure with an interlayer of a plasticized polyvinyl acetal resin using a polyacrylate adhesive containing acid at an interfacial surface between the interlayer and the resin sheet.

U.S. Pat. No. 3,681,167 to Moore discloses a method of forming a laminate of cast monomeric acrylic resin sheets having a core of extruded polycarbonate resin sheet by utilizing as a press polishing mold a plate of a double spring hard special copper alloy having a mirror polished surface, which plate may be nickel plated or plated on the nickel with a layer of chromium. Such highly mirror polished pressed plates or a heat or chemically tempered glass with highly polished parallel surfaces are used to press polish and laminate superimposed layers of acrylic and polycarbonate sheets together under heat and pressure.

U.S. Pat. No. 3,808,077 to Rieser and Chabal discloses a method of laminating a so-called bilayer windshield having an outer layer of glass or relatively hard plastic and an inner flexible layer of polyurethane plastic or plasticized polyvinyl butyral by subjecting such an assembly to heat and pressure applied through a pair of glass molds having smooth surfaces and of complementary curvature to the shape of the bilayer to be formed with a parting material at the interfacial surface between the inner layer and one of the glass molds. The surface of the flexible layer exposed to the pressure applied through the adjacent smoothly surfaced glass mold develops the smooth surface of the glass mold.

U.S. Pat. No. 3,810,815 to Welhart, Voss and Harrell discloses diffusion bonding a layer of acrylic resin sheet to a layer of polycarbonate resin in the presence of heat and pressure using pressing plates of stainless steel coated with a high temperature mold release agent or polyethylene terephthalate (Mylar) to diffusion bond at least one layer of acrylic resin sheet to a layer of polycarbonate resin in the presence of high pressure and a temperature of 320° F. (160° C.) to form a clad polycarbonate.

U.S. Pat. No. 4,078,107 to Bitterice and Keslar discloses a method and apparatus for simultaneously press polishing and laminating a lightweight laminated plastic window using a pair of glass sheets having smooth surfaces through which pressure is applied in a heated environment.

SUMMARY OF THE INVENTION

The present invention provides a means for press polishing curved acrylic plastic components of solid sheet material that form a part of lightweight aircraft transparencies using a press polished polycarbonate sheet of complementary curvature as a pressing member. In addition, the polycarbonate may also be used to laminate lightweight aircraft transparencies containing one or more acrylic plastic sheets simultaneously with the press polishing operation.

The polycarbonate pressing sheets which are used to press polish the exposed surfaces of the acrylic plastic sheets are first press polished while flat at elevated temperature not exceeding 360° F. (182° C.) and preferably about 315° F. (157° C.) and at elevated pressure between a pair of flat press polishing molds of glass having optically smooth surfaces. The press polished polycarbonate is shaped by gravity sag bending followed by vacuum forming to the upper shaping surface of a vacuum forming mold at an elevated temperature not exceeding 325° F. (163° C.). Likewise, each acrylic resin sheet component of an aircraft transparency to be fabricated may be first press polished while flat by applying pressure at elevated temperature not exceeding 315° F. (157° C.) for cast acrylic plastic through glass press polishing molds having optically smooth, flat surfaces to press polish the acrylic plastic resin sheet component. Then, each flat, acrylic resin sheet component so press polished is shaped by gravity sag bending followed by vacuum forming to conform to the upward facing shaping surface of a vacuum forming mold of complementary curvature at a maximum temperature of 260° F. (127° C.) for cast acrylic plastic or of 225° F. (107° C.) for stretched acrylic plastic.

The shaped polycarbonate sheets are used as press polishing molds to press polish the surface of the shaped acrylic plastic resin sheets. In cases where the acrylic plastic resin sheets are to be laminated, the shaped polycarbonate press polishing molds apply pressure against an assembly of two or more acrylic resin plastic sheets of complementary curvature conforming to the shape of the polycarbonate press polishing mold with flexible interlayer material therebetween, to laminate said acrylic resin sheets simultaneously with the press polishing operation.

In fabricating lightweight aircraft transparencies containing acrylic plastic sheets according to the teachings of the present invention, the use of press polishing molds of glass having smoothly polished surfaces is limited to press polishing flat polycarbonate sheets and flat acrylic plastic resin sheets, and to fusion bond flat sheets of acrylic plastic resin to one another. The acrylic plastic resin sheets to be fusion bonded may have wire embedded within the surface thereof. The wire embedded in one of the acrylic resin sheets prior to said fusion bonding is used as a component of a static dissipation circuit. The wire embedded in the other flat acrylic resin sheet to be fusion bonded provides a component of a heating circuit which is used to dissipate fog or frost from the surface of the fabricated transparency.

Shaped polycarbonate sheets are superior to shaped press polishing sheets composed of glass when used to press polish or simultaneously press polish and laminate acrylic plastic resin sheets shaped to conforming curvatures for several reasons. First of all, polycarbonate can be readily shaped to complicated curvatures by gravity sagging and vacuum forming at a relatively low temperature range slightly higher than the forming range of acrylic resin. Glass sheets, on the other hand, require much higher temperatures for shaping to complicated shapes, and require press bending, which imposes surface marks of press bending molds onto the heat-softened glass surface, for shaping at lesser temperatures which are considerably higher than those needed to soften polycarbonates. To shape glass sheets to complicated shapes without press bending brings the glass to an elevated temperature at which surface devitrification or degradation takes place. The surface devitrification or degradation pattern on glass press polishing molds is replicated on the surface of the acrylic resin sheet that is press polished. In addition, when a shaped glass sheet is used as a press polishing mold to press polish a plastic sheet of polycarbonate or acrylic resin, rubbing marks sometimes develop at the surface of either the polycarbonate or acrylic plastic resin sheet that faces the shaped glass sheet mold. These rubbing marks are believed to be due to dissimilar thermal expansion coefficients between the mold and the sheet to be press polished.

When a curved polycarbonate sheet replaces a glass sheet as a press polishing mold applied at elevated pressure at a suitable press polishing temperature for acrylic resin, rubbing marks are substantially reduced and virtually eliminated, perhaps because polycarbonate and acrylic plastic have more similar thermal expansion coefficients. Furthermore, polycarbonate press polishing molds do not develop devitrified surfaces when they are shaped to the complicated curvatures required for press polishing and laminating acrylic resin sheets. Consequently, polycarbonate press polishing molds of complementary, complicated curvature have been found to be superior to glass press polishing molds for press polishing and laminating sheets of complementary curvature of acrylic plastic resin.

The shaped acrylic plastic resin sheets are assembled with sheets of flexible interlayer material such as polyurethane or plasticized polyvinyl butyral in order to form an assembly to be laminated. This assembly of curved acrylic resin sheets and flexible interlayer material is applied against one or more press polishing molds of polycarbonate, the assembly so formed is temporarily taped together, inserted within a flexible plastic bag, and the bag subjected with its contents to evacuation followed by elevated temperature and pressure at a standard production autoclave cycle, commonly 150 minutes at 200 pounds per square inch (14 kilograms per square centimeter) and at a temperatuure of 215° F. (102° C.). The assembly is removed from the bag, the tape is removed from the margin of the assembly, and the shaped polycarbonate pressing plates, surprisingly, can be separated from the assembly that was laminated. A curved laminated transparency comprising alternate layers of acrylic resin and interlayer material results.

The benefits of the present invention will be understood more clearly in the light of a description of a preferred embodiment of the present invention that follows.

BRIEF DESCRIPTION OF THE DRAWINGS

In the drawings that form part of the description of a preferred embodiment of the present invention, and wherein like reference numbers refer to like structural elements, FIG. 1 is a fragmentary sectional view across a vacuum forming fixture showing a flat sheet of polycarbonate mounted over a mold in position to be shaped;

FIG. 2 is a view similar to FIG. 1 showing the relationship of the shaped polycarbonate sheet to the mold after shaping;

FIG. 3 is an enlarged fragmentary view of an end portion of FIG. 2 to show certain details more clearly;

FIG. 4 is an exploded view of a pair of flat acrylic resin sheets having wire embedded therein, which sheets are to be fused together;

FIG. 5 shows a pair of flat sheets of acrylic plastic resin with wire embedded therein showing how they are oriented relative to one another and applied between a pair of press polishing molds composed of smoothly surfaced flat glass sheets for simultaneous press polishing and fusion bonding;

FIG. 6 is a view similar to FIG. 1 showing a flat, fused acrylic resin composite sheet mounted for shaping over the upward facing shaping surface of a mold included in a vacuum forming fixture;

FIG. 7 is a view similar to FIG. 2 showing the fused acrylic plastic composite sheet after it has been shaped to conform to the upward facing surface of the mold of FIG. 6;

FIG. 8 is a view similar to FIG. 3 showing how tiny surface openings develop in the vicinity of wire embedded in the convex surface of a wire embedded acrylic sheet as a result of its shaping depicted in FIG. 7;

FIG. 9 is a fragmentary cross-sectional view showing how a series of shaped, acrylic resin sheets including a fused acrylic resin sheet is assembled with a flexible layer of interlayer material, an additional shaped, acrylic resin sheet and a polycarbonate press polishing mold of complementary curvature during its preparation for final lamination;

FIG. 10 is a view similar to FIG. 9 showing how the assembly of FIG. 9 is further assembled and its edge taped in preparation for insertion within a laminating bag for final lamination;

FIG. 11 is a table showing operational steps performed according to the present invention;

DESCRIPTION OF A PREFERRED EMBODIMENT

Figure 13:
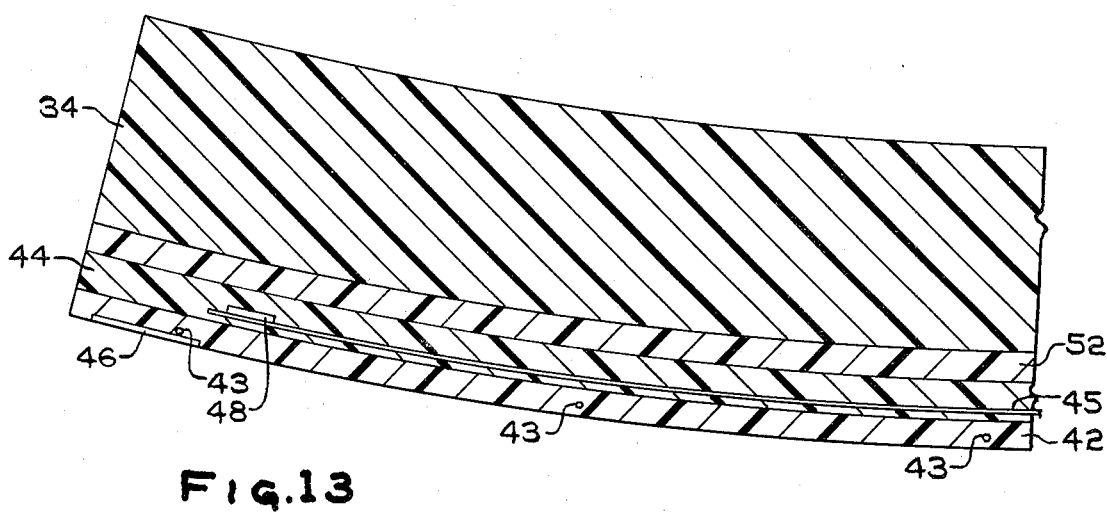
FIG. 13 is an enlarged, fragmentary sectional view taken along the lines 13—13 of FIG. 12.

The present invention will be described in conjunction with the production of a laminated transparent window for lightweight aircraft that comprises an outer sheet of cast acrylic plastic resin 30 mils (0.8 millimeters) thick fusion bonded to a second sheet of cast acrylic plastic resin 60 mils (1.5 millimeters) thick, an interlayer of polyvinyl butyl plasticized with dibutyl sebacate 50 mils (1.3 millimeters) thick, and an inner layer of stretched acrylic plastic resin 5/16 inch (79.4 millimeters) thick. The acrylic resin is polymethyl methacrylate. The interlayer may be polyurethane instead of polyvinyl butyral. The inner layer may be cast acrylic resin. The thicknesses and/or arrangement of the various components may vary, thus requiring a slight modification of the handling temperatures during the various treatment steps described. Other plasticizers may be used for the interlayer.

In the drawings which form part of a description of a preferred embodiment of the present invention, FIGS. 1 to 3 disclose how either a press polishing mold of polycarbonate or a layer of acrylic plastic resin is shaped to complemental curvature on a vacuum forming fixture. The shaping is performed by a combination of heat sagging followed by vacuum forming steps to be described later.

The vacuum forming fixture includes a base that comprises a frame of interconnected base members 20, each composed of tubing of square cross-section of fiber glass reinforced epoxy resin composition. Extending upward from each base member are a plurality of uprights 22 composed of the same material as the base members 20. Each upright 22 is connected at its lower end to its associated base member 20 and extends upward to be connected at its upper end to a mold reinforcing frame member 24 that interconnects with other mold frame members 24 to form a mold reinforcing frame.

The latter extends circumferentially slightly within the outline of a shaping mold 26 provided by a shaped layup of fiber glass reinforced epoxy resin. The shaping mold 26 has an upward facing shaping surface conforming to the shape to which a sheet of press polished plastic (polycarbonate or acrylic plastic resin) is to be formed by gravity sag bending followed by vacuum forming. The mold reinforcing frame members 24 engage the lower surface of the shaped layup that comprises the shaping mold 26.

Approximately twenty flexible layers of fiber glass cloth impregnated with epoxy resin are superimposed over one another to a thickness of approximately ⅜ inch (9.5 millimeters). The fiber glass reinforced epoxy resin mold 26 is formed over a shaping surface formed on a plaster or epoxy mold which is supplied by a customer. The plaster or epoxy mold is initially oriented with its shaping surface facing convexly upward. A release coat of silicone or a rubbed paste wax is applied to the upper surface of the plaster mold. Several layers of flexible fiber glass cloth are superimposed over the release coat and impregnated with epoxy resin. The fiber glass reinforced epoxy resin layers are air dried for 12 hours while resting on the plaster mold, and then are removed from the plaster mold and curved in an oven for about 24 hours at a temperature above the use temperature of the plastic material to be shaped. An aperture 28 is drilled through the thickness of the shaped mold 26 and a vacuum tube 30 is attached to the lower end of the aperture 28 when the shaped mold is oriented with its concave shaping surface facing upward to provide means to evacuate air from the shaping surface facing upward of the shaping mold 26. The mold 26 is then mounted onto the mold reinforcing frame members 24.

FIG. 1 shows a sheet of polycarbonate 32 or a monolithic sheet of acrylic plastic resin 34 that may have been previously press polished by pressurized engagement against the opposite surfaces of a flat, smoothly surfaced glass sheet with parting material interposed therebetween to provide smooth surfaces for the polycarbonate sheet or the acrylic plastic resin. A suitable elevated pressure for press polishing sheets of polycarbonate or acrylic plastic is 200 pounds per square inch (14 kilograms per square centimeter). The maximum temperature to which confined polycarbonate sheets may be exposed should not exceed about 360+ F. (182° C.) and press polishing is preferably performed at about 315° F. (157° C.) when glass plates are used to press polish flat polycarbonate sheets. The temperature for confined cast acrylic resin sheets should not exceed 325° F. (163° C.) and their press polishing is preferably done in the range of 250° F. (121° C.) to 275° F. (135° C.), although confined cast acrylic resin sheets may be fused together without damage at temperatures slightly exceeding 315° F. (157° C.). The maximum temperatures for exposing stretched acrylic plastic resin sheets should not exceed 225° F. (107° C.).

Before a smooth, flat, press polished polycarbonate sheet is mounted on the vacuum shaping fixture, a smoothly surfaced, porous sheet 36 of polyurethane foam or felt (Dacron) is first applied to the upper surface of the mold 26. The polycarbonate sheet supported on the mold is heated to approximately 300° F. (149° C.) when the polycarbonate sheet is ¼ inch (6.3 millimeters) thick. The polycarbonate sheet is soaked for approximately one-half hour or until such time as the polycarbonate sheet sags into substantial conformity with the flexible porous sheet 36 of polyurethane foam or felt. The vacuum forming fixture is temporarily removed from the oven and a diaphragm 38 of polyvinyl fluoride or similar fluid impervious material is applied by tape 39(Mylar) over the upper surface of the polycarbonate sheet 32 and to the outside of a bead 40 of a caulking compound that has been previously applied around the marginal edge of the shaping mold 26 to form an enclosed peripheral chamber surrounding the polycarbonate sheet 32. The vacuum forming fixture with the partly shaped sheet thereon is reinserted in the oven and immediately reheated to 300° F. (149° C.) with vacuum applied through the aperture 28 and the vacuum line 30 for as long as is necessary to bring the sheet of polycarbonate 32 into full conformity with the layer 36 to polyurethane foam or felt which is porous enough to provide exhaustion of the air that is removed by vacuum through the aperture 28. After a period of applying vacuum that can last from less than one minute to approximately 30 minutes, the shaped sheet of polycarbonate 32 conforms exactly to the complicated shape desired. The vacuum forming fixture is then removed from the oven, the polyvinyl fluoride diaphragm 38 is removed from the upper edge periphery of the sheet to be shaped, and the shaped polycarbonate sheet 32 is removed with its major concave surface maintained in smooth condition. The shaped polycarbonate sheet 32 is ready to be used as a press polishing plate for press polishing and/or simultaneously press polishing and laminating one or more shaped acrylic resin sheets.

If the sheet to be shaped is an acrylic resin sheet 34, it is handled in a similar manner as the polycarbonate sheet 32 on the shaping mold 26, except that the times and temperatures for the sag bending and vacuum forming steps may be modified to comply with the upper temperature limits specified for handling cast acrylic resin sheets and stretched acrylic resin sheets previously enumerated. A typical temperature for shaping cast acrylic is 250° F. (121° C.) and for stretched acrylic resin is 215° F. (102° C.). In producing a typical lightweight plastic window, a stretched acrylic resin sheet 312 mils (79.4 millimeters) thick is shaped at a temperature of 215° F. (102° C.) by a combination of sag bending and vacuum forming similar to the procedure described for shaping polycarbonate.

After two or more acrylic resin sheets are shaped by heat sagging and vacuum forming, they may be assembled to form an assembly of acrylic plastic sheets and intervening layers of flexible interlayer material for additional fabrication leading to the completion of a laminated transparency of acrylic plastic resin.

If it is desired to fabricate a curved transparent window having embedded therein a wire static electricity dissipating circuit with or without a wire heating circuit, it has been found advisable to embed wire in a desired pattern to form a portion of an electroconductive static dissipation circuit adjacent the outboard glazed surface of a sheet of acrylic plastic resin. Such aircraft transparencies are disclosed in U.S. Pat. No. 4,078,107 to Michael G. Bitterice and Leroy D. Keslar. In the formation of a transparent plastic window containing both a static dissipation wire circuit and a heating wire circuit, a first sheet of acrylic plastic resin 42 having a thickness of 30 mils (0.8 millimeters) is provided with relatively widely spaced wire runs 43 that serve as a circuit element of a static electricity dissipation circuit. An additional sheet of transparent acrylic plastic resin 44 having a thickness of 60 mils (1.6 millimeters) is provided with a plurality of closely spaced wire runs 45 which serve as a circuit element of a heating circuit. A typical wire used is a tungsten-molybdenum alloy having a diameter of 1.5 mils (0.4 millimeters) and arranged in reversely extending, sinuous lengths along said wire runs. The runs 43 are approximately parallel to one another and are spaced 2 to 4 inches (5 to 10 centimeters) apart, while the runs 45 are parallel to one another and spaced about 30 mils (0.8 millimeters) apart.

FIG. 4 shows a pair of solid, acrylic plastic resin sheets provided with embedded wire. These sheets have the wire runs embedded therein while flat. It is desirable to fuse bond the sheets 42 and 44 together using flat glass press polishing molds against the opposite surfaces of the sheets 42 and 44 of acrylic plastic resin having wire embedded therein with suitable parting material between the glass molds and the acrylic resin sheets.

The widely spaced wire runs 43 embedded with the surface of the acrylic plastic resin sheet 42 are connected to bus bars 46 (see FIG. 12) which are adapted to be connected to ground via lead lines 47. The closely spaced wire runs 45 embedded within the surface of the acrylic plastic resin sheet 44 are interconnected between a pair of bus bars 48. Lead lines 49 extend from the bus bars 48 for connection to exterior circuit elements after the transparency is laminated.

While fully exposed cast acrylic resin sheets are limited to exposure to a maximum temperature of approximately 275° F. (135° C.) for sag bending, when cast acrylic resin sheets are fully confined between press polishing plates, they can withstand higher temperatures for a limited period. Consequently, it is customary to press polish and fuse together the wire containing sheets of flat cast acrylic plastic resin at a pressure of 200 pounds per square inch (14 kilograms per square centimeter) and at a temperature of 315° F. (157° C.) for 60 minutes between flat glass press polishing molds.

In assembling the sheets for pressure fusing, the wire runs 43 of sheet 42 are parallel and extend in one direction and the wire runs 45 of sheet 44 are parallel and extend transversely of the wire runs 43. The surface of sheet 42 adjacent which wire runs 43 are embedded faces away from sheet 44 and the surface of the sheet 44 adjacent which the wire runs 45 are embedded faces the opposite surface of sheet 42 during assembly. Consequently, after fusion, the flat, solid, fused sheet of acrylic plastic resin that results has the wire runs 43 embedded closely adjacent to one surface of the solid, fused sheet, while the wire runs 45 are embedded within the thickness of the solid, fused sheet.

The fused, solid, flat sub-assembly is then ready for a shaping operation in which the sub-assembly of fused, solid, flat sheets 42 and 44 is mounted in bending relation over a layer 36 of porous felt or porous polyurethane foam mounted on the shaping surface of the mold 26 with the wire runs 43 close to the lower surface of the flat, solid, fused sheet, as depicted in FIG. 6. The fused assembly is sag bent at 250° F. (121° C.) by heat soaking within an oven for about 20 minutes. Then, the polyvinyl fluoride diaphragm 38 and the tape 39 is applied between the upper surface of the heat-sagged composite fused acrylic resin sheet 42, 44 and the peripherally extending bead 40 of caulking compound to form a vacuum chamber through which vacuum is applied through the vacuum line 30 and aperture 28 to complete the shaping of the fused acrylic composite sheet 42, 44 into conformity with the desired complicated shape of the shaping mold 26 within the oven at 250° F. (121° C).

During the shaping of the solid, fused sheet, the lower surface develops an outer convex shape and tiny surface openings 51 develop near the wire runs 43 during this operation. Fortunately, these tiny surface openings can be healed and made smooth by further processing to be described.

All of the acrylic resin components 34, and the fused, solid, shaped sheets 42, 44 of the laminated transparency to be produced are now ready for assembly and final lamination. A list of various steps in the assembly of the acrylic resin elements with a polycarbonate press polishing sheet used in the lamination of the transparency is disclosed in FIG. 11.

The shaped composite of fused, solid shaped acrylic plastic resin sheets 42 and 44 is assembled with a layer of flexible interlayer material 52 applied against the concave surface of sheet 44. Slits are formed in the edge portions of the layer 52. Lead lines connected to the wire runs 43 and 45, respectively, are extended through the slits formed in the sheet of interlayer material 52 and extend outward of the assembly for access after lamination is completed. A solid sheet of shaped acrylic plastic resin 34 (preferably stretched) destined to be the interior layer of the laminated window is then mounted against the opposite surface of the interlayer 52 and the extended portions of the leads 47 and 49 attached to the wire runs 43 and 45 are taped against the outer edge surfaces of the sheet 34 where suitable. The assembly is then turned upside down and a polycarbonate mold 32 formed by press polishing and shaping a sheet of polycarbonate 32 in the manner described previously is then applied against the convex surface of the solid, acrylic plastic resin sheet 42 to form an assembly in the manner depicted in FIG. 9. The assembly is then reoriented once more to place the polycarbonate press polishing mold 32 at the bottom of the assembly and a blanket 54 of silicone rubber, such as RTV-630 silicone rubber, available from General Electric, is applied over the upper surface of the assembly so formed. Tape 56 is applied to the marginal edge portion of the assembly to hold the elements in place. The assembled relationship of the elements is depicted in FIG. 10.

The assembly of FIG. 10 is wrapped within a thin covering of polyvinyl fluoride. The wrapped assembly is then inserted within a laminating bag, preferably of the type depicted in U.S. Pat. No. 3,255,567 of Keslar and Rankin. The laminating bag (not shown) is formed of two plies including an outer ply of polyethylene glycol terephthalate, commercially known as Mylar, and an inner ply of polyethylene bound thereto. The inner ply of polyethylene is embossed along its inner surfaces to form a checkerboard pattern of rounded protuberances to permit the escape of air. The assembly, arranged as described, is inserted within the bag, the bag is evacuated and sealed and the assembly subjected to the following autoclave cycle. First, the assembly is heated to a maximum temperature of 217° F. (103° C.) and the pressure is increased to 200 pounds per square inch (13.6 atmospheres) and held for 150 minutes. The temperature is reduced to 100° F. (38° C.), the pressure is lowered to atmospheric pressure, the bag is opened and the assembly inspected.

During the final lamination, the tiny surface openings 51 that develop during the shaping of the flat, solid, fused sheet of acrylic resin 42, 44 heal and any optical defect that would accompany such defects are either virtually eliminated or rendered so small as to be unobservable by the human eye.

A preferred embodiment of this invention consists of an outer layer of PLEXIGLAS II (polymethyl methacrylate conforming to Military Specification MIL-P-5425) 30 mils (0.8 millimeter) thick fused to an inner layer of PLEXIGLAS II 60 mils (1.5 millimeter) thick, an interlayer of polyvinyl butyral plasticized with dibutyl sebacate 50 mils (1.27 millimeters) thick and an inner layer of stretched PLEXIGLAS 55 polymethyl methacrylate 5/16 inch (79.4 millimeters) thick conforming to Military Specification MIL-P-25690A. The embedded wires for both the heating and the anti-static circuits were of molybdenum-tungsten wire 1.5 mil (0.038 millimeter) thick with its reversely connected runs spaced 2 inches (5 centimeters) apart from run to run in the anti-static circuit and 30 mils (0.76 millimeter) apart in the heating circuit. The bus bar 46 for the anti-static circuit was a wire mesh 0.0055 inch (0.14 millimeter) thick, approximately ¼ inch (6.35 millimeters) wide and the bus bars 48 for the heating circuit were composed of two layers of 2.5 mil (0.064 millimeter) thick tinned copper approximately ¼ to ⅜ inch (6.35 to 9.52 millimeters) wide superimposed on one another against opposite surfaces of the embedded wire runs forming the heating circuit.

Figure 12:
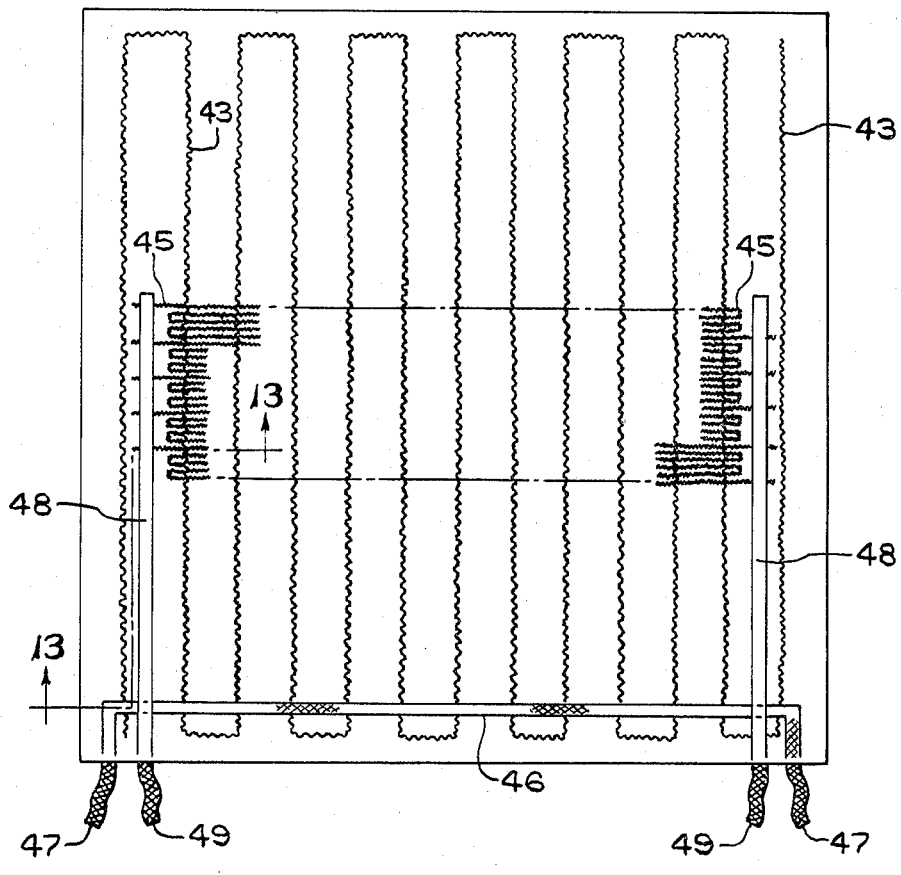
FIG. 12 is a plan view of a laminate of rectangular outline incorporating elements assembled as depicted in FIGS. 9 and 10.

FIGS. 12 and 13 are included to show the arrangement of a heating circuit with heating wire runs 45 arranged in the geometrical center of the transparency with their connections to bus bars 48 and lead lines 49 and wire runs 43 of the static dissipation circuit connected to a bus bar 46 and adapted for grounding through lead lines 47 in a typical arrangement.

The polycarbonate press polishing molds which are useful in the practice of the invention are rigid sheet materials which are well known in the art and are available under the trademarks LEXAN and NUCLON. Such polymers are prepared by reacting di-(monohydroxyaryl)-alkanes with derivatives of carbonic acid such as phosgene. Such polymers are of high molecular weight and are described in "Polycarbonates" by W. P. Christopher and D. W. Fox, Chapter 2, pages 13 to 20. Also, rigid polycarbonates are described in U.S. Pat. No. 3,028,365 to Schnell et al.

In performing the final lamination step, the press polished concave surface of the rigid, shaped polycarbonate press polishing mold 32 is applied directly against the press polished convex surface of acrylic plastic resin sheet 42 without any parting material therebetween. One skilled in the art would expect that at the same high pressure conditions that cause a layer of acrylic plastic resin to fusion bond to polycarbonate in only 10 minutes, it would be necessary to apply a parting material between the polycarbonate press polishing mold and the acrylic plastic resin sheet in order to separate the polycarbonate from the acrylic plastic resin after 150 minutes at such high pressure conditions. However, when the lamination is performed at a maximum temperature of 217° F. (103° C.), the polycarbonate mold separates easily and readily from the contacted surface of acrylic plastic resin after completing the simultaneous press polishing and laminating step. Avoiding the need for applying a parting material to an interfacial surface saves time and expense and is an unexpected benefit of this invention.

The form of the invention shown and described in this disclosure represents an illustrative preferred embodiment. It is understood that the basic principle of the present invention can be used in the fabrication of shaped transparencies having one or more acrylic plastic resin sheets that are preferably press polished and/or laminated simultaneously with press polishing with a surface thereof held in pressurized engagement against a surface of complemental curvature of polycarbonate and that the configuration, shape, size, thickness and outlines of the various components can vary from those enumerated for the illustrative embodiment described without departing from the gist of the invention as defined by the claimed subject matter which follows. It is also understood that the present invention also includes the auxiliary principles involving the combination of press polishing the polycarbonate molds and the acrylic plastic resin sheet components (monolithic or fused) while flat to produce press polished surfaces and shaping the polycarbonate molds and the acrylic plastic resin sheet components by a combination of heat sagging and vacuum forming at elevated temperatures within certain temperature limits prescribed for each material so as to maintain the surface smoothness obtained by press polishing the sheets while flat during shaping to complemental shapes so that the sheets can be shaped, assembled and laminated using shaped polycarbonate molds to produce smoothly surfaced, lightweight transparencies having the desired shape and optical properties for its acrylic plastic resin.

We claim:

1. A method of press polishing a surface of a curved solid sheet of cast or stretched acrylic resin comprising holding a rigid, smoothly surfaced sheet of polycarbonate of complemental curvature against said surface with no parting material therebetween to form an assembly, and subjecting said assembly to sufficient elevated pressure and temperature for sufficient time for said surface of said rigid acrylic resin sheet to develop the smoothness of said polycarbonate sheet, said temperature being a maximum of 250° F. (121° C.) for cast acrylic resin and 217° F. (103° C.) for stretched acrylic resin so that it is below the deformation temperature of said polycarbonate sheet and sufficiently high to press polish the surface of said acrylic resin sheet without unduly softening said acrylic resin sheet.

2. A method as in claim 1, wherein said curved sheet of acrylic resin has a convex surface that has tiny surface openings therein comprising holding a concavely curved smooth surface of complementary curvature of said polycarbonate sheet against said convex surface of said acrylic resin sheet during said elevated pressure and temperature subjecting step.

3. A method as in claim 2, wherein said sheet of acrylic resin has wire embedded in close proximity to each of said tiny surface openings in said convex surface, and said elevated pressure and temperature subjecting step is continued until sufficient acrylic resin at said convex surface of said acrylic resin sheet flows over said wire to smooth said tiny surface openings to the extent that said tiny surface openings are no longer visible to the naked eye.

4. A method as in claim 1, 2 or 3, further including preparing said polycarbonate sheet while flat by press polishing said sheet of polycarbonate while flat by holding said flat polycarbonate sheet in pressurized engagement against a smoothly surfaced, flat glass sheet and shaping said polycarbonate sheet so press polished by heat sagging and vacuum forming said heat-sagged polycarbonate sheet to said complemental curvature, said preparing said sheet of acrylic resin while flat by press polishing said sheet of acrylic resin while flat by holding said flat acrylic resin sheet in pressurized engagement against a smoothly surfaced, flat glass sheet and shaping said sheet of acrylic resin so press polished by heat sagging and vacuum forming said heat sagged press polished sheet of acrylic resin to said complementary curvature prior to said press polishing step.

5. A method as in claim 4, wherein said heat sagging and vacuum forming is performed at a maximum temperature of 325° F. (163° C.) for shaping said polycarbonate, at a maximum temperature of 275° F. (135° C.) for shaping as cast acrylic resin and at a maximum temperature of 225° F. (107° C.) for shaping stretched acrylic resin.

6. A method as in claim 3, further including preparing said sheet of acrylic resin with wire embedded in close adjacency to said surface while flat by embedding wire within a first sheet of acrylic resin adjacent one surface thereof while flat, embedding wire within a second sheet of acrylic resin adjacent a surface thereof while flat, assembling said flat sheets of acrylic resin with the surface of one of said sheets of acrylic resin containing wire adjacent thereto facing away from said other of said sheets of acrylic resin and the surface of the other of said sheets of acrylic resin containing wire adjacent thereto facing the opposite surface of said one sheet of acrylic resin, assembling said flat sheets of acrylic resin in pressurized engagement against a pair of smoothly surfaced flat glass sheets, applying sufficient heat and pressure to said assembly of flat sheets of acrylic resin through said flat glass sheets to fuse said flat sheets of acrylic resin to form a fused sheet of acrylic resin, and shaping said sheet of acrylic resin so fused by heat sagging said fused sheet toward an upward facing surface having said complementary curvature and vacuum forming said heat sagged fused sheet to said complementary curvature prior to press polishing said fused sheet against said smoothly surfaced sheet of polycarbonate of complementary curvature.

7. A method as in claim 6 wherein said flat sheets of acrylic resin having wire embedded therein are oriented so that the wires embedded in one of said acrylic resin sheets extend generally in one direction and the wires embedded in said other of said acrylic resin sheets extend in a direction transverse to said one direction during said assembling step.

8. A method as in claim 6 further including assembling said curved, fused sheet of acrylic resin against a layer of flexible interlayer material selected from the group consisting of polyurethane and plasticized polyvinyl butyral so that the surface of said curved, fused sheet of acrylic resin opposite said surface facing said polycarbonate sheet faces said layer of flexible interlayer material and assembling another curved sheet of acrylic resin of curvature conforming to that of said curved, fused sheet of acrylic resin against the opposite surface of said layer of flexible interlayer material, whereby said curved, fused sheet of acrylic resin is laminated to said other curved sheet of acrylic resin during the press polishing of said surface of said fused sheet of acrylic resin.

9. A method as in claim 8 further including preparing said polycarbonate sheet by press polishing said sheet of polycarbonate while flat by holding said flat polycarbonate sheet in pressurized engagement against a smoothly surfaced, flat glass sheet and shaping said press polished polycarbonate sheet by heat sagging said press polished polycarbonate sheet toward an upwardly facing shaping surface having said complementary curvature and vacuum forming said heat sagged polycarbonate sheet to complete its shaping to said complementary curvature, and preparing each of said sheets of acrylic resin by press polishing each of said sheets of acrylic resin while flat by holding each of said flat sheets of acrylic resin in pressurized engagement against a smoothly surfaced, flat glass sheet and shaping said sheet of acrylic resin so press polished by heat sagging said sheet of acrylic resin toward an upwardly facing shaping surface having said complementary curvature and vacuum forming said heat sagged sheet of acrylic resin to complete its shaping to said complementary curvature prior to said simultaneous press polishing and laminating step.

10. A method as in claim 9, wherein said heat sagging and vacuum forming is performed at a maximum temperature of 325° F. (163° C.) for shaping said polycarbonate, at a maximum temperature of 275° F. (135° C.) for shaping as cast acrylic plastic and at a maximum temperature of 225° F. (107° C.) for shaping stretched acrylic plastic.

11. A method as in claim 1, further including assembling said sheet of acrylic resin against a layer of flexible interlayer material selected from the group consisting of polyurethane and plasticized polyvinyl butyral so that the surface of said sheet of acrylic resin opposite said surface facing said polycarbonate sheet faces said layer of flexible interlayer material and assembling another curved sheet of acrylic resin of curvature conforming to that of said first named sheet of acrylic resin against the opposite surface of said layer of flexible interlayer material, whereby said curved sheets of acrylic resin are laminated to one another during the press polishing of said surface of said first named sheet of acrylic resin.

12. A method as in claim 11 further including preparing said polycarbonate sheet while flat by press polishing said sheet of polycarbonate while flat by holding said flat sheet of polycarbonate in pressurized engagement against a smoothly surfaced, flat glass sheet and shaping said polycarbonate sheet so press polished by heat sagging said polycarbonate sheet toward an upward facing shaping surface having said complementary curvature and vacuum forming said heat sagged polycarbonate sheet to complete its shaping to said complementary curvature, and preparing each of said sheets of acrylic resin while flat by press polishing each of said sheets of acrylic resin while flat by holding each said flat sheet of acrylic resin in pressurized engagement against a smoothly surfaced, flat glass sheet and shaping said sheet of acrylic resin so press polished by heat sagging said sheet of acrylic resin toward an upward facing shaping surface having said complementary curvature and vacuum forming said heat sagged sheet of acrylic resin to complete its shaping to said complementary curvature prior to said simultaneous press polishing and laminating step.

13. A method as in claim 1, wherein said press polishing method is accomplished using a sheet of polycarbonate having a thickness of approximately one-quarter inch (6.35 millimeters).

* * * * *